United States Patent
Sarathy et al.

(10) Patent No.: US 11,758,350 B2
(45) Date of Patent: Sep. 12, 2023

(54) POSTURE TRANSITION DETECTION AND CLASSIFICATION USING LINKED BIOMECHANICAL MODEL

(71) Applicant: Apple Inc., Cupertino, CA (US)

(72) Inventors: Aditya Sarathy, Santa Clara, CA (US); Xiaoyuan Tu, Sunnyvale, CA (US); Suresh B. Malakar, Cupertino, CA (US); Hui Lin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/485,212

(22) Filed: Sep. 24, 2021

(65) Prior Publication Data
US 2023/0100254 A1   Mar. 30, 2023

(51) Int. Cl.
H04S 7/00 (2006.01)
G06F 9/448 (2018.01)
G06F 18/2415 (2023.01)

(52) U.S. Cl.
CPC ............ H04S 7/304 (2013.01); G06F 9/4498 (2018.02); G06F 18/24155 (2023.01); *H04S 2400/11* (2013.01)

(58) Field of Classification Search
None
See application file for complete search history.

(56) References Cited

U.S. PATENT DOCUMENTS

2016/0205459 A1* 7/2016 Kamada ............... H04R 1/1041
                                                              381/74
2021/0409891 A1* 12/2021 Zhang ..................... G06F 3/167

FOREIGN PATENT DOCUMENTS

CN          112784812 A   *   5/2021

OTHER PUBLICATIONS

Fu et al, Google Patent translation of CN112784812. pp. 1-5. Published May 11, 2021. (Year: 2021).*

* cited by examiner

*Primary Examiner* — Qin Zhu
(74) *Attorney, Agent, or Firm* — Fish & Richardson P.C.

(57) ABSTRACT

Embodiments are disclosed for user posture transition detection and classification using a linked biomechanical model. In an embodiment, a method comprises: obtaining motion data from a headset worn by a user; selecting features of a linked biomechanical model based on a current posture state; determining at least one probability that a posture transition occurred based on an output of a classifier, where the output of the classifier is based on the selected features and the motion data; determining a posture transition based on the at least one probability; and performing at least one action based on detection of the posture transition.

22 Claims, 9 Drawing Sheets

LEANING PHASE    MOMENTUM PHASE    EXTENSION PHASE

POSTURE TRANSITION DETECTION AND CLASSIFICATION USING LINKED BIOMECHANICAL MODEL

TECHNICAL FIELD

This disclosure relates generally to motion classification.

BACKGROUND

Existing mobile devices include motion sensors that provide motion data, such as acceleration and rotation rate of the mobile device. The motion data can be used to classify user activities. For example, a digital pedometer can use acceleration data to count steps to determine that the user is walking or running. The pedometer together with acceleration and rotation rate data can also be used to determine if the user is riding in a vehicle. Although these broad activity classifications are useful for many mobile applications, some mobile applications would benefit from knowing if a user's physical posture has changed, such as standing from a seated position or vice versa.

SUMMARY

Embodiments are disclosed for user posture transition detection and classification using a linked biomechanical model.

In an embodiment, a method comprises: obtaining, with at least one processor, motion data from a headset worn by a user; selecting, with the at least one processor, features of a linked biomechanical model based on a current posture state; determining, with the at least one processor, at least one probability that a posture transition occurred based on an output of a classifier, where the output of the classifier is based on the selected features and the motion data; determining, with the at least one processor, a posture transition based on the at least one probability; and performing, with the at least one processor, at least one action based on detection of the posture transition.

In an embodiment, the motion data is acceleration data and the method further comprises: computing, with the at least one processor, a vertical speed component of the user's head based on the motion data; comparing, with the at least one processor, the vertical speed component with a threshold speed; and determining, with the at least one processor, whether or not posture transition has occurred based on the comparing.

In an embodiment, the acceleration data is filtered by a low pass filter.

In an embodiment, the linked biomechanical model is a function of an angle between the ground and the user's thigh and angle between the user's thigh and the user's torso.

In an embodiment, the classifier is a Bayesian classifier that outputs a posterior probability that a posture transition occurred.

In an embodiment, multiple posterior probabilities are computed for multiple measurement epochs, the method further comprising: determining whether there is consensus among the multiple posteriori probabilities; in accordance with there being a consensus, determining whether a time since a last posture transition detection complies with a time threshold; in accordance with there not being a consensus, determining that a posture transition did not occur. determining that a posture transition occurred if there is a consensus and the time since the last posture transition detection satisfies the time threshold.

In an embodiment, determining a posture transition based on the at least one probability comprises comparing the at least one probability to a probability threshold, and determining that the at least one probability satisfies the probability threshold.

In an embodiment, the current posture state is either a sit-to-stand posture state or a stand-to-site posture state.

In an embodiment, the method further comprises: transitioning, with a state machine, from the sit-to-stand posture state to the stand-to-sit posture state, or vice-versa, based on the current posture state.

In an embodiment, performing, with the at least one processor, at least one action based on detection of the posture transition further comprises enabling or re-enabling head pose tracking in an spatial audio application.

In an embodiment, the method is performed on a source device wirelessly coupled to the headset, and wherein the source device is playing content with spatial audio that is rendered for playback by the source device through loudspeakers of the headset.

Other embodiments can include an apparatus, computing device and non-transitory, computer-readable storage medium.

Particular embodiments disclosed herein provide one or more of the following advantages. User posture transition detection and classification provides context information that can be used improve or enhance a variety of mobile applications. These applications include but are not limited to: head pose tracking, exercise repetition counting, posture ergonomics and health monitoring.

The details of one or more implementations of the subject matter are set forth in the accompanying drawings and the description below. Other features, aspects and advantages of the subject matter will become apparent from the description, the drawings and the claims.

DETAILED DESCRIPTION

System Overview

Figure 1A:
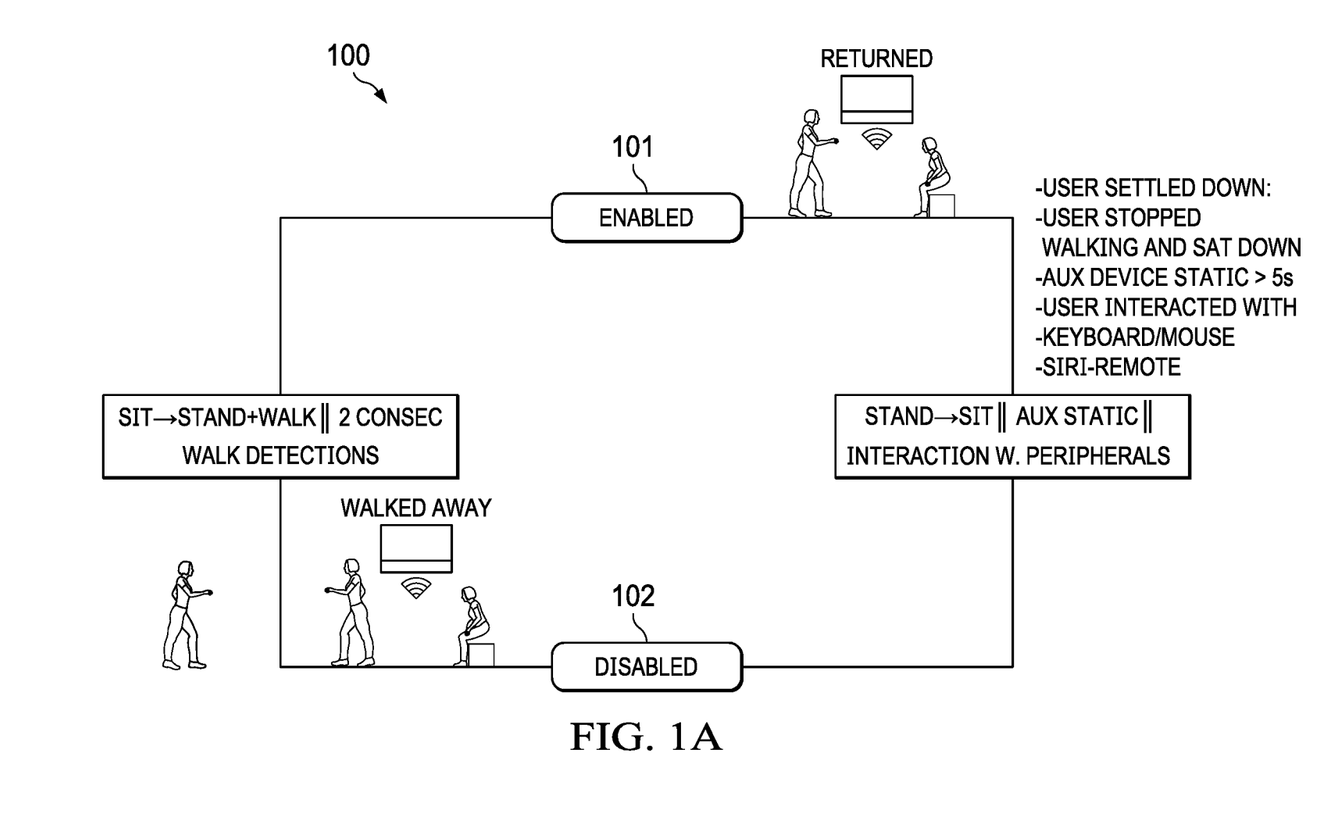
FIG. 1A is a conceptual block diagram of a system for posture transition detection and classification, according to an embodiment.

FIG. 1A is a conceptual block diagram of system 100 for posture transition detection and classification, according to an embodiment. System 100 includes a wireless headset (e.g., ear buds) and a source device (e.g., a tablet computer, notebook computer). The wireless headset includes left and right ear pieces that insert into the user's left and right ear canals, respectively. Motion sensors 101 are included in one or both ear pieces (e.g., 3-axis MEMS accelerometers, 3-axis MEMS gyros). An example headset architecture is described in reference to FIG. 8.

Turning to FIG. 1A, a user is wearing the headset while viewing content (e.g., a movie) on their source device. The source device binaurally renders spatial audio content, which is transferred to the headset over a wireless communication channel (e.g., Bluetooth channel) for playback through loudspeakers in the ear pieces of the headset. The source device also includes motion sensors (e.g., 3-axis MEMS accelerometers, 3-axis MEMS gyros).

In a spatial audio embodiment, motion data from the headset and source device motion are fused in the source device, such that relative position and attitude can be calculated by the source device for use in head pose tracking for certain tracking scenarios to ensure that the spatial audio sound bed is properly centered. In particular, head pose tracking using relative motion is useful for determining whether the user's head is turning while their torso is stationary or whether the user's torso has moved. Both types of motion would be sensed by the headset and would be indistinguishable. Generally, the use of motion data from both the headset and companion device allows more complex user posture transitions to be detected.

In spatial audio applications, it is desirable to provide a natural and immediate re-enablement of head pose tracking after it is disabled due to, for example, distracted user viewing. This requires that head pose tracking be automatically enabled and re-enabled based on the user's posture (e.g., sitting, standing). For example, while the user is sitting, head pose tracking is enabled 101, allowing the user to enjoy an immersive audio experience while watching the content displayed on the source device. In an embodiment, system 100 determines that the user is sitting based on a linked biomechanical model and motion data (e.g., acceleration data), as described in reference to FIGS. 3 and 4.

If the user transitions from a sitting posture to a standing posture and walks away from the source device, the transition is detected by system 100 (using the linked biomechanical model and motion data), causing head pose tracking to be disabled 102. In an embodiment, head pose tracking is disabled 102 if system 100 detects a "sit-to-stand" posture transition and also detects that the user is walking based on the motion data. In an embodiment, the spatial audio processing is disabled 102 if walking is detected for more than N measurement epochs (e.g., N=2 epochs) whether or not a sit-to-stand posture transition is detected by system 100.

System 100 also monitors for the return of the user to the source device by detecting a "stand-to-sit" posture transition (using the linked biomechanical model and motion data) or detects that the headset is static (based on headset motion data) or detects that the user is interacting with peripherals coupled to the source device or headset (e.g. interacting with a wireless remote control or keyboard coupled to the source device). Based on any one of these detections, system 100 assumes that the user has returned to the source device and has settled down to continue viewing the content, and thus re-enables 101 head pose tracking.

Figure 1B:
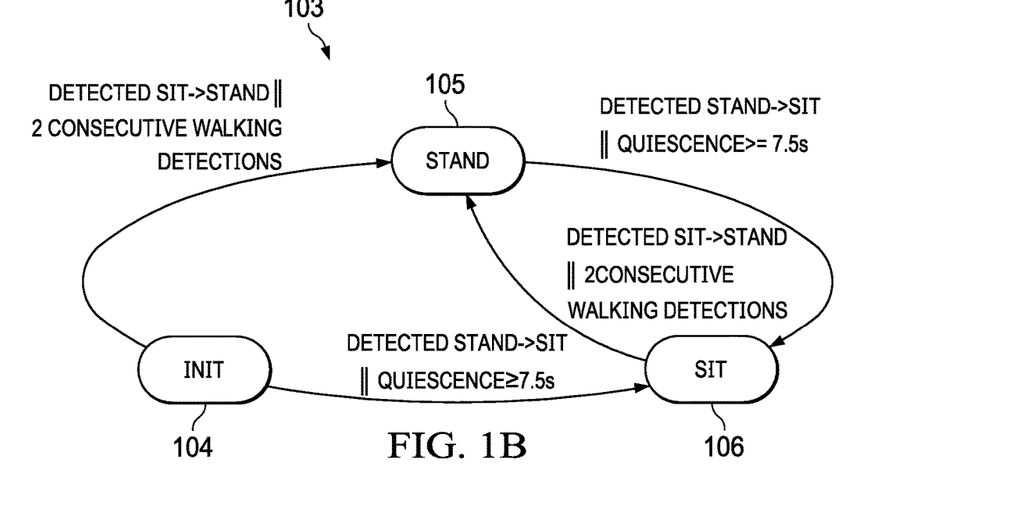
FIG. 1B illustrates a state machine for the posture transition detection and classification system of FIG. 1, according to an embodiment.

FIG. 1B illustrates a state machine 103 for the posture transition detection and classification described in reference to FIG. 1A, according to an embodiment. State machine 103 includes initialization ("init") state 104, "stand" state 105 and a "sit" state 106. Starting from init state 104, if a sit-to-stand posture transition is detected or walking is detected for N consecutive epochs, state machine 103 transitions from init state 104 to stand state 105. Also, state machine 103 transitions from init state 104 to sit state 106 if a stand-to-sit posture transition is detected or there is headset motion quiescence for more than M seconds (e.g., >7.5 seconds), where quiescence is detected when motion is not detected by motion sensors in the headset, or motion sensors in the headset and the source device for relative head pose tracking (referred to as "mutual quiescence").

Figure 4A:
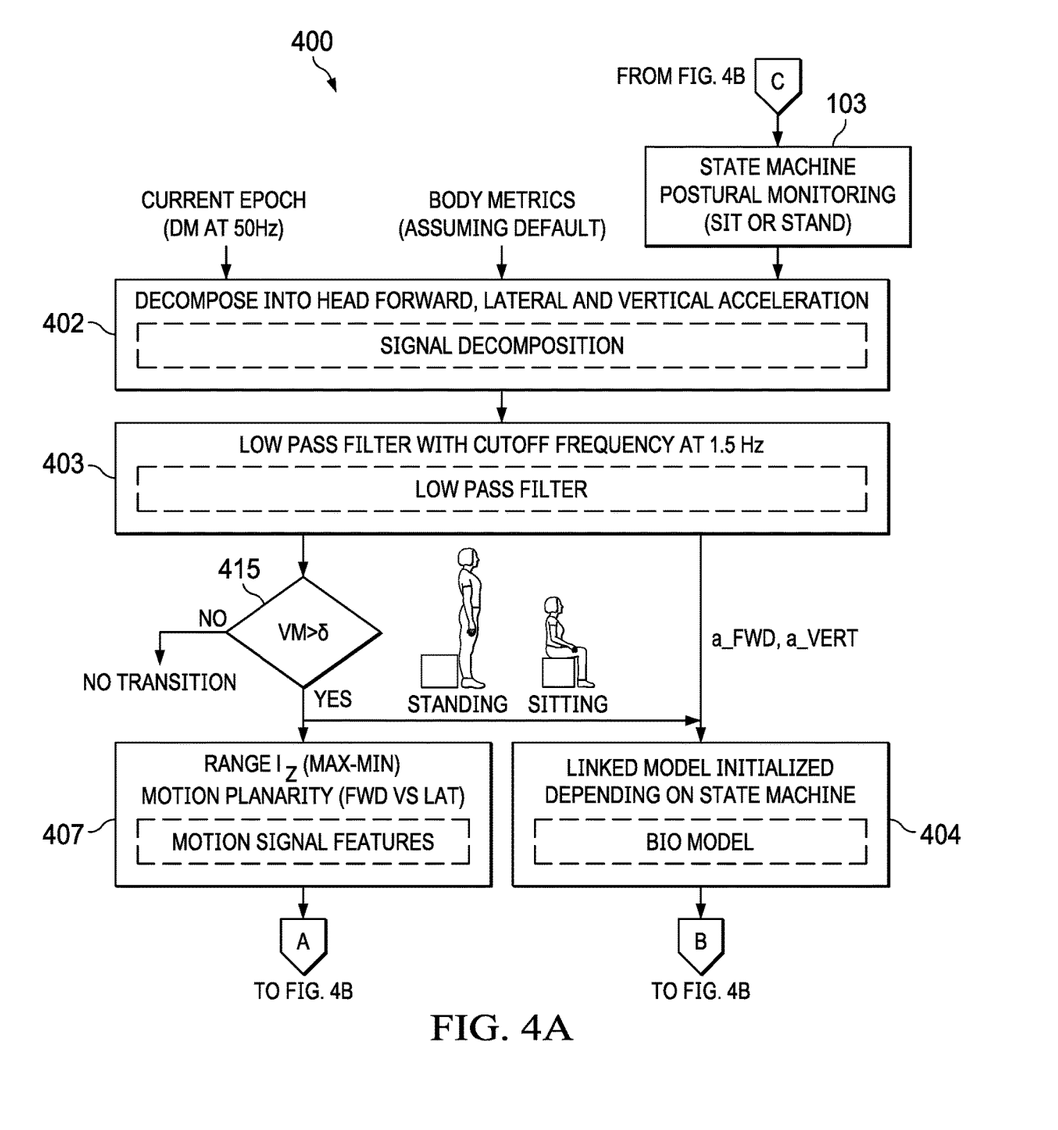
FIGS. 4A and 4B are a block diagram of a system for detecting and classifying posture transitions using the linked biomechanical model described in FIG. 3, according to an embodiment.
Figure 4B:
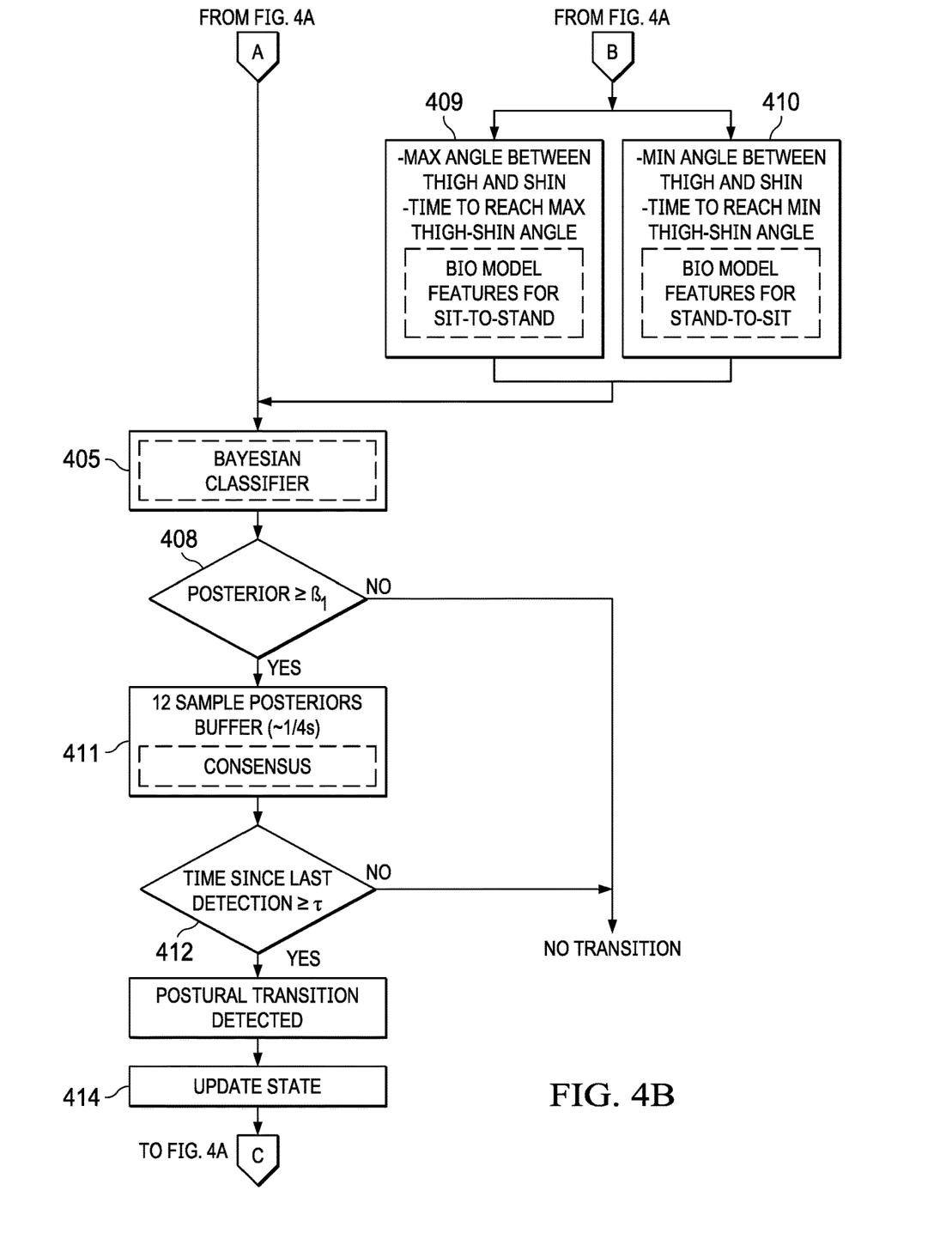

From stand state 105, state machine 103 transitions to sit state 106 if a stand-to-sit posture transition is detected or there is headset motion quiescence for more than M seconds (e.g., >7.5 seconds). From sit state 106, state machine 103 transitions to stand state 105 if a sit-to-stand posture transition is detected and N walking is detected for N consecutive measurement epochs. As described below in reference to FIG. 4, the current state output by state machine 103 is used to initialize a linked biomechanical model, and determine which features of the linked biomechanical model are to be used to determine a posture transition.

Figure 2:
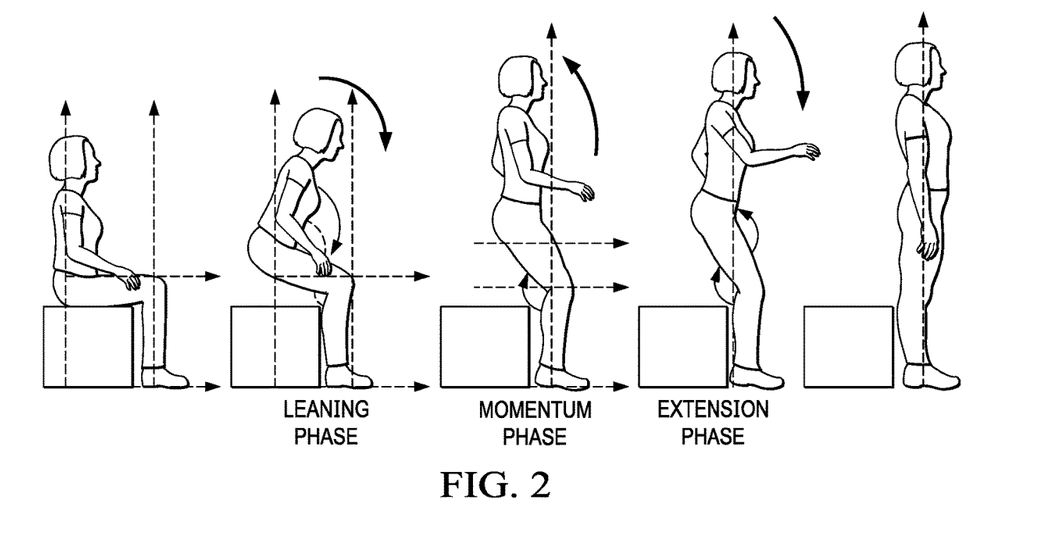
FIG. 2 illustrates the biomechanics of a sit-to-stand posture transition, according to an embodiment.

FIG. 2 illustrates the biomechanics of a sit-to-stand posture transition, according to an embodiment. A user is shown in a seated position 201. When the user starts to stand they enter a leaning phase 202, where the user leans her body forward to change her center of gravity. The leaning phase 202 is a reversible phase in that the user can return to her seated position 201. Note that the leaning phase 202 imparts a rotation of the user's torso that can be sensed by a 3-axis MEMS gyro in the headset worn by the user described above.

After the leaning phase 202, the user enters a momentum phase 203 where the user uses her legs to propel her body to a standing position. Note that the momentum phase 203 imparts a vertical and lateral acceleration which can be sensed by a 3-axis accelerometer in the headset worn by the user. After the momentum phase 202, the user enters an extension phase 204 where the user extends her body in the vertical direction while she leans slightly forward to shift her center of gravity to prevent herself from falling backwards. The momentum and extension phases 203, 204 are irreversible phases as the user cannot go back to a seated position and must continue forward into a standing position 205. The biomechanics described above can be modeled using the linked biomechanical model described in reference to FIG. 3.

Figure 3:
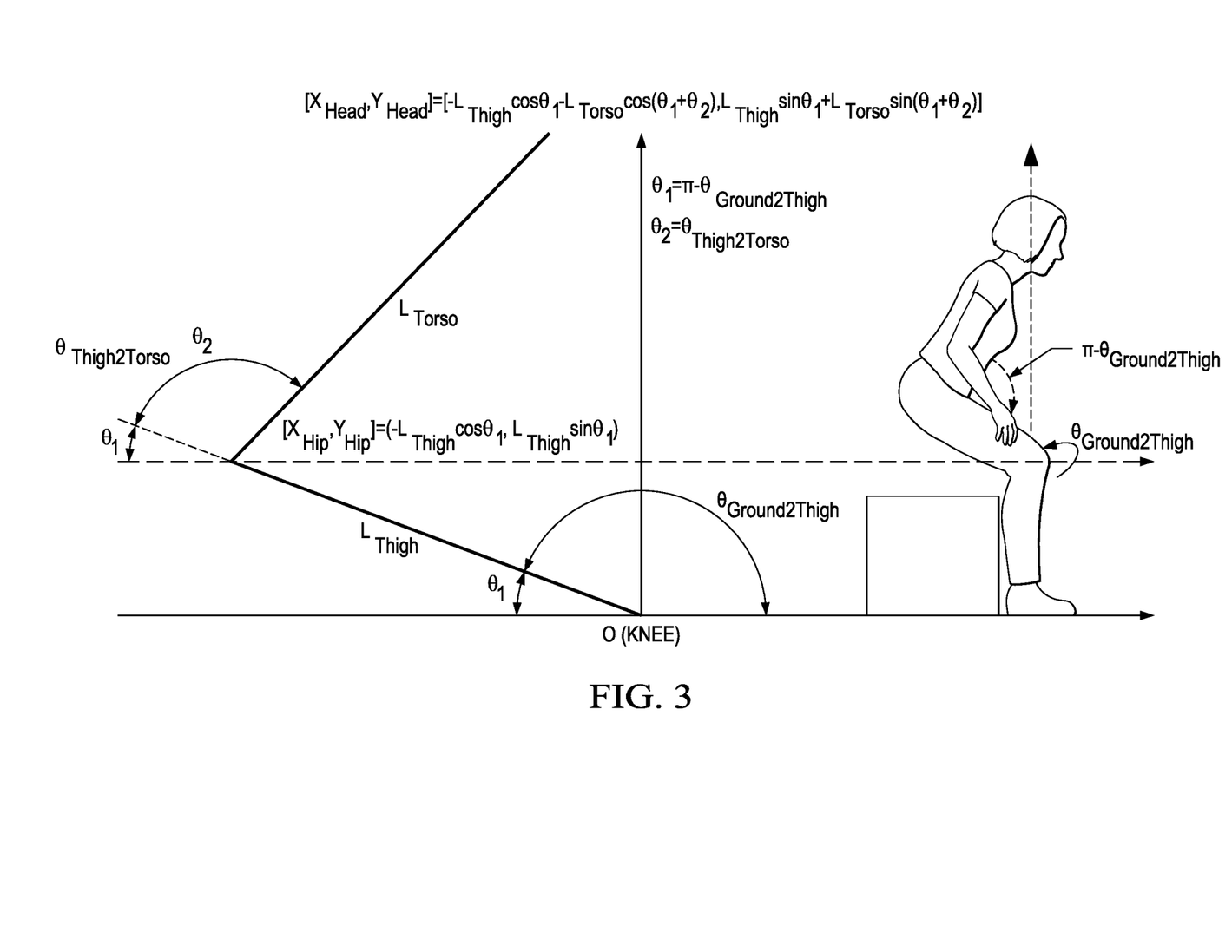
FIG. 3 illustrates a linked biomechanical model for the biomechanics shown in FIG. 2, according to an embodiment.

FIG. 3 illustrates a linked biomechanical model for posture transition detection and classification, according to an embodiment. The forward ($x_{Head}$) and vertical ($y_{Head}$) position coordinates of the user's head position [$x_{Head}$, $y_{Head}$] can be determined from the angle $\theta_1$ between the user's thigh and the ground, and the angle $\theta_2$ between the user's thigh and the user's torso according to Equation [1]:

$$[x_{Head}, y_{Head}] = [-L_{Thigh} \cos \theta_1 - L_{Torso} \cos(\theta_1 + \theta_2), \\ L_{Thigh} \sin \theta_1 + L_{Torso} \sin(\theta_1 + \theta_2)] \quad [1]$$

where $\theta_1 = \pi - \theta_{Ground2Thigh}$, $\theta_2 = \theta_{Thigh2Torso}$, $L_{Thigh} = 0.2*$Height and $L_{Toro} = 0.5*$Height. The user's height (Height) can be provided by the user through an interface of the source device or estimated based on the user's estimated stride length (e.g., Height~0.4*stride_length), where the user's stride length can be estimated from the user's step count (e.g., determined from zero crossings or the frequency spectrum of acceleration data).

FIGS. 4A and 4B are a block diagram of a system 400 for detecting and classifying posture transitions using the linked biomechanical model described in FIG. 3, according to an embodiment. System 400 includes signal decomposer 402, low pass filter 403, linked biomechanical model 404, classifier 405, consensus counter 406 and motion signal extractor 407.

Signal decomposer 402 receives acceleration data for a current measurement epoch (e.g., every 0.2 seconds), body metrics (e.g., Height, $L_{Thigh}$, $L_{Torso}$) and a current state from state machine 103, described in reference to FIG. 1B. Signal decomposer 402 decomposes the acceleration vector received from the headset (e.g., provided via a 3-axis MEMS accelerometer) into head forward acceleration [$a_{FWD}$], head lateral acceleration [$a_{LAT}$] and head vertical acceleration [$a_{VERT}$] components in a head reference frame. The components are input into low pass filter 403 with a specified cutoff frequency (e.g., 1.5 Hz) to obtain average acceleration components. The magnitude or norm of the acceleration vector $V_M$ is computed and compared 408 against a threshold, $\delta$. If $V_M$ exceeds the threshold $\delta$ 415, then no user posture transition is detected and state machine 103 maintains its current state. If $V_M$ exceeds the threshold $\delta$ 415, then system 400 continues with posture detection as described below.

Linked biomechanical model 404 is initialized based on the current state of state estimator 103. In an embodiment, linked biomechanical model 404 is initialized every measurement epoch. During initialization, the angles $\theta_1(t_0)$ and $\theta_2(t_0)$ are initialized depending on a "stand" state 106 or "sit" state 105 of state machine 103, as shown in FIG. 1B.

After initialization, trajectories of the angles $\theta_1(t)$ and $\theta_2(t)$ are computed over the epoch time period (e.g., computed over 2 seconds). Depending on the current state of the state machine 103, either features 409 for a sit-to-stand posture transition or features 410 for a stand-to-sit posture transition are derived from linked biomechanical model 404. Features 409 include the maximum angle between the user's thigh and the user's shin and the time to reach the maximum thigh-shin angle. Features 410 include the minimum angle between the thigh and shin and the time to reach the minimum thigh-shin angle. Features 409, 410, together with motional signal features output by motion signal feature generator 407 are input into classifier 406. Linked biomechanical model 404 assumes that the shin is perpendicular to the ground, i.e., the angle between the shin and ground is 90°. The motion signal parameters are derived by motion signal feature generator 407 and include a range measurement $I_z$ and a measure of motion planarity (e.g., forward versus lateral). In an embodiment, $I_z$ is the difference between the maximum and minimum inertial vertical acceleration component for the epoch, and motion planarity is computed as the norm of the lateral acceleration divided by the norm of forward acceleration.

In an embodiment, classifier 406 is a Bayesian classifier that computes a posterior probability that a posture transition is detected. The Bayesian classifier can be formulated as a maximum a posteriori (MAP) decision rule that assigns a class label $\hat{y}=C_k$ for some k as shown in Equation [2]:

$$\hat{y} = \underset{k \in \{1,...,K\}}{\operatorname{argmax}} p(C_k) \prod_{i=1}^{n} p(x_i \mid C_k), \quad [2]$$

where $C_k$ is a class, k is the number of possible classes, $x_i$ are features 409 or 410, depending on the current state and motion signals. In an embodiment, $p(C_k)=1$ such that the final posteriori probability is only a product of the likelihood ratios.

In other embodiments, classifier 406 can be a perceptron, decision tree, logistic regression, k-nearest neighbor, neural network/deep learning or support vector machine (SVM) or any other suitable classifier.

If features 409 are used as input, classifier 406 outputs a posterior probability that a stand-to-sit transition occurred. If features 410 are used as input, classifier 406 outputs a posterior probability that a sit-to-stand transition occurred. If the posterior probability is determined 408 to be less than a threshold probability, $\beta$, then no transition is detected and consensus counter 406 is cleared to zero. If the posterior probability is determined 408 to be greater than or equal $\beta$, to then consensus counter 411 is incremented by one.

If the count maintained by consensus counter 411 satisfies L (e.g., equals L or some specified number less than L), but the time elapsed since a last posture transition detection satisfies (e.g., greater than or equal to) a time threshold $\tau$ 412, then a user posture transition is not detected and state machine 103 maintains its current state. If the count maintained by consensus counter 411 satisfies L and the time elapsed since the last posture transition detection does not satisfy the time threshold $\tau$ 412 (e.g., less than $\tau$), then a user posture transition is detected and state machine 103 transitions to a new state based on its current state. If the count maintained by consensus counter 411 is less than L or some number less than L, then a user posture transition is not detected.

Although the linked biomechanical model 404 emulates body movement via links for the torso and thigh only, the Equations set forth above can be modified to model emulate the torso, thigh and shin movements as well, and also include a separate mechanical link to describe neck movement.

An example will now be described to further explain the operation of system 400. A user is currently sitting at a desk and watching a movie with spatial audio. Their tablet computer is resting on the desk. The user is wearing a headset as previously described. State machine 103 is in sit state 106 The user stands up and walks away from their tablet computer, which remains resting on the desk. System 400 samples an acceleration vector output by a 3-axis MEMS accelerometer in the headset. The acceleration vector is decomposed into forward, lateral and vertical components and the head speed is checked against a speed threshold. In this example, the head speed exceeds the threshold indicating that a potential posture transition has occurred. Features 413 are extracted from the linked biomechanical model 404 and input, together with motion signal features derived from the acceleration data, into classifier 305, which is a Bayesian classifier that predicts a posteriori probability of a sit-to-stand posture transition, which is compared to a probability threshold. L posterior probabilities are computed over L measurement epochs to determine if there is a consensus among the L posteriori probabilities. There is a consensus among the L epochs (e.g., all L posterior probabilities exceed the probability threshold). The time since the last detection is also determined to exceed the time threshold. A sit-to-stand posture transition is thus detected 413, and state machine 103 updates 414 from sit state 106 to stand state 105, as shown in FIG. 1B.

Figure 5:
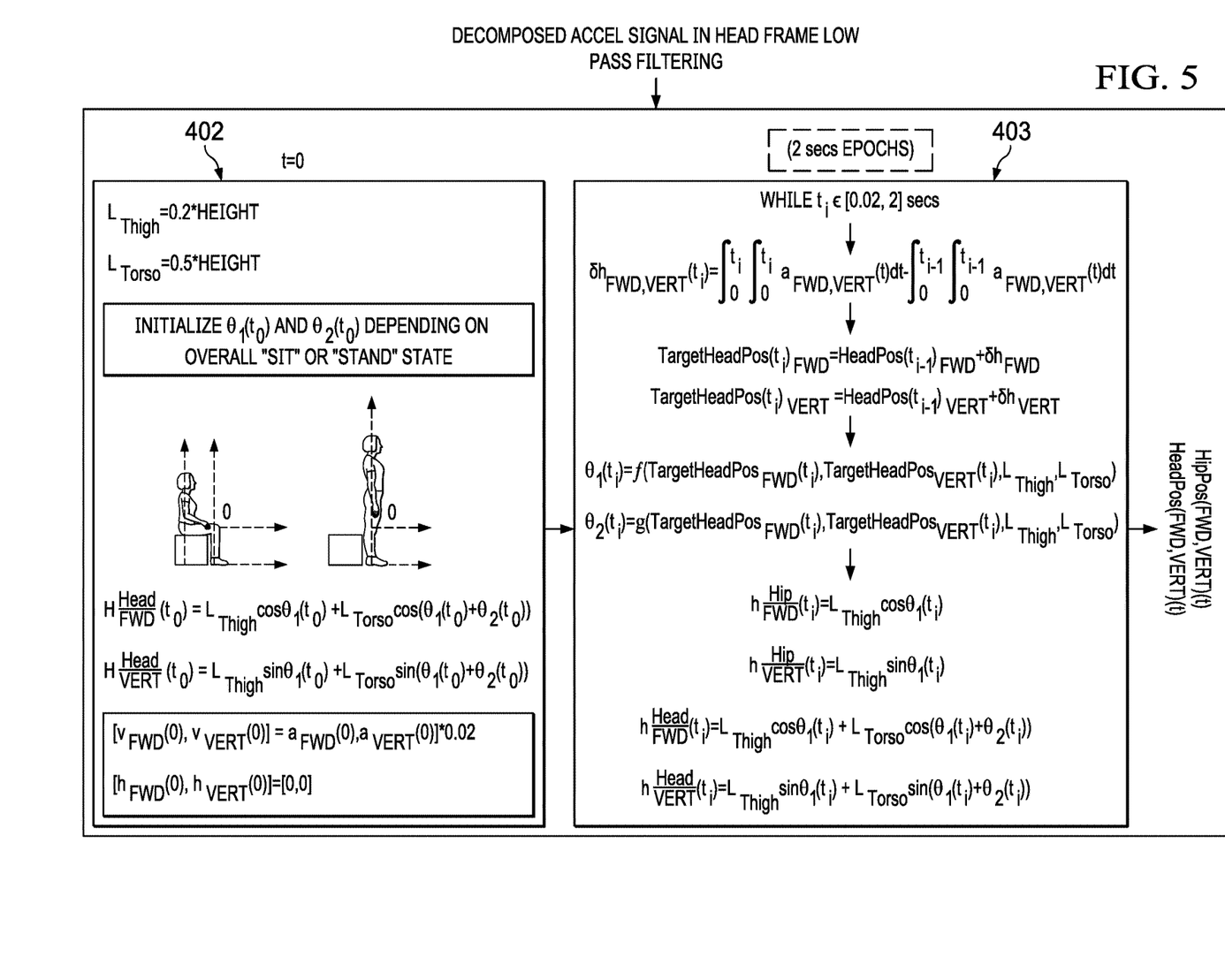
FIG. 5 illustrates computation of hip and head position using the linked biomechanical model, according to an embodiment.

FIG. 5 illustrates computation of the hip and head position using the linked biomechanical model of FIG. 3, according to an embodiment. System 400 is initialized 502 based on the current state. This initialization includes initializing $L_{Thigh}$, $L_{Torso}$, $\theta_1(t_0)$, and $\theta_1(t_0)$ and the user's head position, velocity and acceleration in a head reference frame, as shown in FIG. 5. For every measurement epoch 503 (e.g., every 0.2 seconds), the change in the user's head position is computed and added to the user's current head position to get a target (updated) head position for the forward and vertical components of the head position in the head reference frame. The angles $\theta_1(t_i)$, and $\theta_1(t_i)$ are then updated using Equation [1] and the target (updated) head position. The updated angles $\theta_1(t_i)$, and $\theta_1(t_i)$ are then used to compute the forward and vertical components of the user's hip position and head position for the current measurement epoch, as shown in FIG. 5. The head position, hip position components are then input into classifier 405 together with motion signal features output by motional signal generator 407.

Example Process

Figure 6:
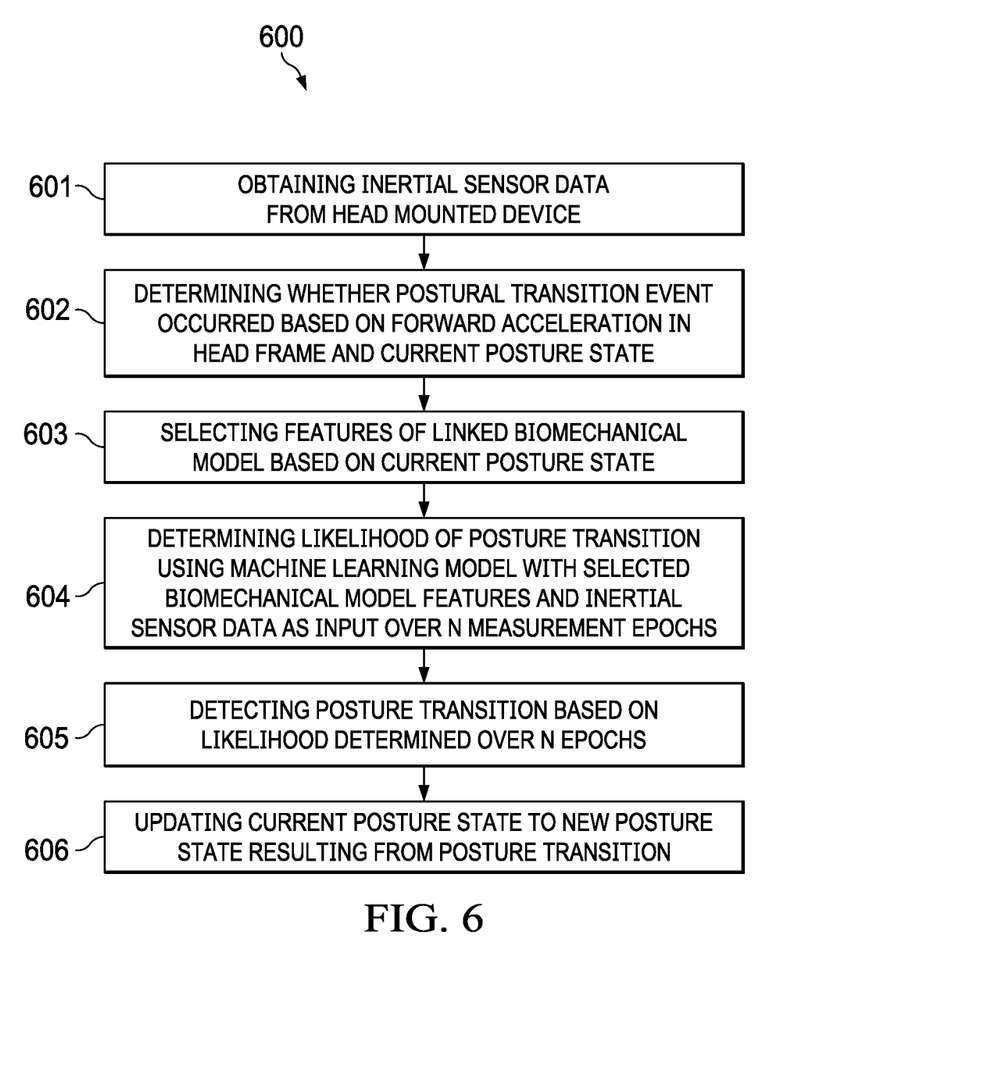
FIG. 6 is a flow diagram of a process of posture transition detection and classification using a linked biomechanical model, according to an embodiment.

FIG. 6 is a flow diagram of a process 600 of posture transition detection and classification using a linked biomechanical model, according to an embodiment. Process 600 can be implemented using the software/hardware architectures described in reference to FIGS. 7 and 8.

Process 600 includes the steps of obtaining motion data from a headset worn by a user (601), selecting features of a linked biomechanical model based on a current posture state (602), determining at least one probability that a posture transition occurred based on an output of a classifier (603), where the output of the classifier is based on the selected features and the motion data, determining a posture transition based on the at least one probability (604); and performing at least one action based on detection of the posture transition (605). Each of these steps were described in detail with reference to FIGS. 1-5.

Example Software/Hardware Architectures

Figure 7:
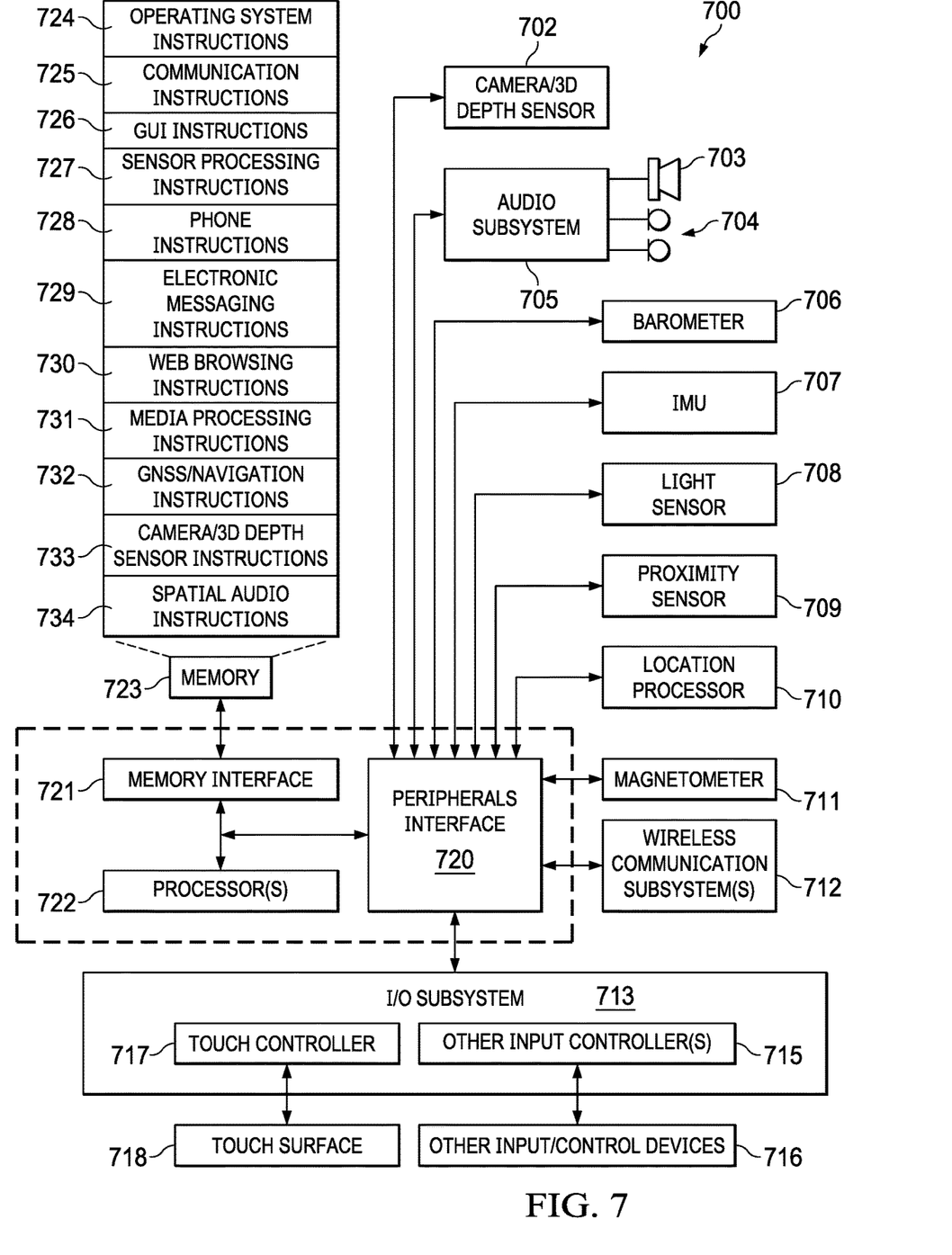
FIG. 7 is a conceptual block diagram of a source device software/hardware architecture implementing at least one of the features and operations described in reference to FIGS. 1-6.

FIG. 7 is a conceptual block diagram of source device software/hardware architecture 700 implementing the features and operations described in reference to FIGS. 1-6. Architecture 700 can include memory interface 721, one or more data processors, digital signal processors (DSPs), image processors and/or central processing units (CPUs) 704 and barometer 706. Memory interface 721, one or more processors 722 and/or peripherals interface 720 can be separate components or can be integrated in one or more integrated circuits.

Sensors, devices and subsystems can be coupled to peripherals interface 720 to provide multiple functionalities. For example, one or more motion sensors 707, light sensor 708 and proximity sensor 709 can be coupled to peripherals interface 720 to facilitate motion sensing (e.g., acceleration, rotation rates), lighting and proximity functions of the wearable computer. Location processor 710 can be connected to peripherals interface 720 to provide geo-positioning. In some implementations, location processor 710 can be a GNSS receiver, such as the Global Positioning System (GPS) receiver. Electronic magnetometer 720 (e.g., an integrated circuit chip) can also be connected to peripherals interface 720 to provide data that can be used to determine the direction of magnetic North. Electronic magnetometer 711 can provide data to an electronic compass application. Motion sensor(s) 707 can be an IMU that includes one or more accelerometers and/or gyros (e.g., 3-axis MEMS accelerometer and 3-axis MEMS gyro) configured to determine change of speed and direction of movement of the source device. Barometer 706 can be configured to measure atmospheric pressure around the mobile device.

Camera/3D depth sensor 702 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 712, which can include radio frequency (RF) receivers and transmitters (or transceivers) and/or optical (e.g., infrared) receivers and transmitters. The specific design and implementation of the wireless communication subsystem 712 can depend on the communication network(s) over which a mobile device is intended to operate. For example, architecture 700 can include communication subsystems 724 designed to operate over a GSM network, a GPRS network, an EDGE network, a Wi-Fi™ network and a Bluetooth™ network. In particular, the wireless communication subsystems 712 can include hosting protocols, such that the mobile device can be configured as a base station for other wireless devices.

Audio subsystem 705 can be coupled to a speaker 703 and one or more microphones 704 to facilitate voice-enabled functions, such as voice recognition, voice replication, digital recording and telephony functions. Audio subsystem 705 can be configured to receive voice commands from the user.

I/O subsystem 713 can include touch surface controller 717 and/or other input controller(s) 715. Touch surface controller 717 can be coupled to a touch surface 718. Touch surface 718 and touch surface controller 717 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 718 can include, for example, a touch screen or the digital crown of a smart watch. I/O subsystem 713 can include a haptic engine or device for providing haptic feedback (e.g., vibration) in response to commands from processor 722 or a digital signal processor (DSP). In an embodiment, touch surface 718 can be a pressure-sensitive surface.

Other input controller(s) 744 can be coupled to other input/control devices 748, such as one or more buttons, rocker switches, thumb-wheel, infrared port and USB port. The one or more buttons (not shown) can include an up/down button for volume control of speaker 703 and/or microphones 704. Touch surface 718 or other input control devices 716 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 718; and a pressing of the button for a second duration that is longer than the first duration may turn power to the mobile device on or off. The user may be able to customize a functionality of one or more of the buttons. The touch surface 718 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 721 can be coupled to memory 723. Memory 723 can include high-speed random access memory and/or non-volatile memory, such as one or more magnetic disk storage devices, one or more optical storage devices and/or flash memory (e.g., NAND, NOR). Memory 750 can store operating system 724, such as the iOS operating system developed by Apple Inc. of Cupertino, Calif. Operating system 752 may include instructions for handling basic system services and for performing hardware dependent tasks. In some implementations, operating system 724 can include a kernel (e.g., UNIX kernel).

Memory 723 may also store communication instructions 725 to facilitate communicating with one or more additional devices, one or more computers and/or one or more servers, such as, for example, instructions for implementing a software stack for wired or wireless communications with other devices. Memory 723 may include graphical user interface instructions 726 to facilitate graphic user interface processing; sensor processing instructions 727 to facilitate sensor-related processing and functions; phone instructions 728 to facilitate phone-related processes and functions; electronic messaging instructions 729 to facilitate electronic-messaging related processes and functions; web browsing instructions 730 to facilitate web browsing-related processes and functions; media processing instructions 731 to facilitate media processing-related processes and functions; GNSS/Location instructions 732 to facilitate generic GNSS and location-related processes; and camera/3D depth sensor instructions 733 for capturing images (e.g., video, still images) and depth data (e.g., a point cloud). Memory 723 further includes spatial audio instructions 734 for use in spatial audio applications, including head pose tracking instructions and posture transition determination instructions for implementing the features described in reference to FIGS. 1-6.

Each of the above identified instructions and applications can correspond to a set of instructions for performing one or more functions described above. These instructions need not be implemented as separate software programs, procedures, or modules. Memory 23 can include additional instructions or fewer instructions. Furthermore, various functions of the mobile device may be implemented in hardware and/or in software, including in one or more signal processing and/or application specific integrated circuits.

Figure 8:
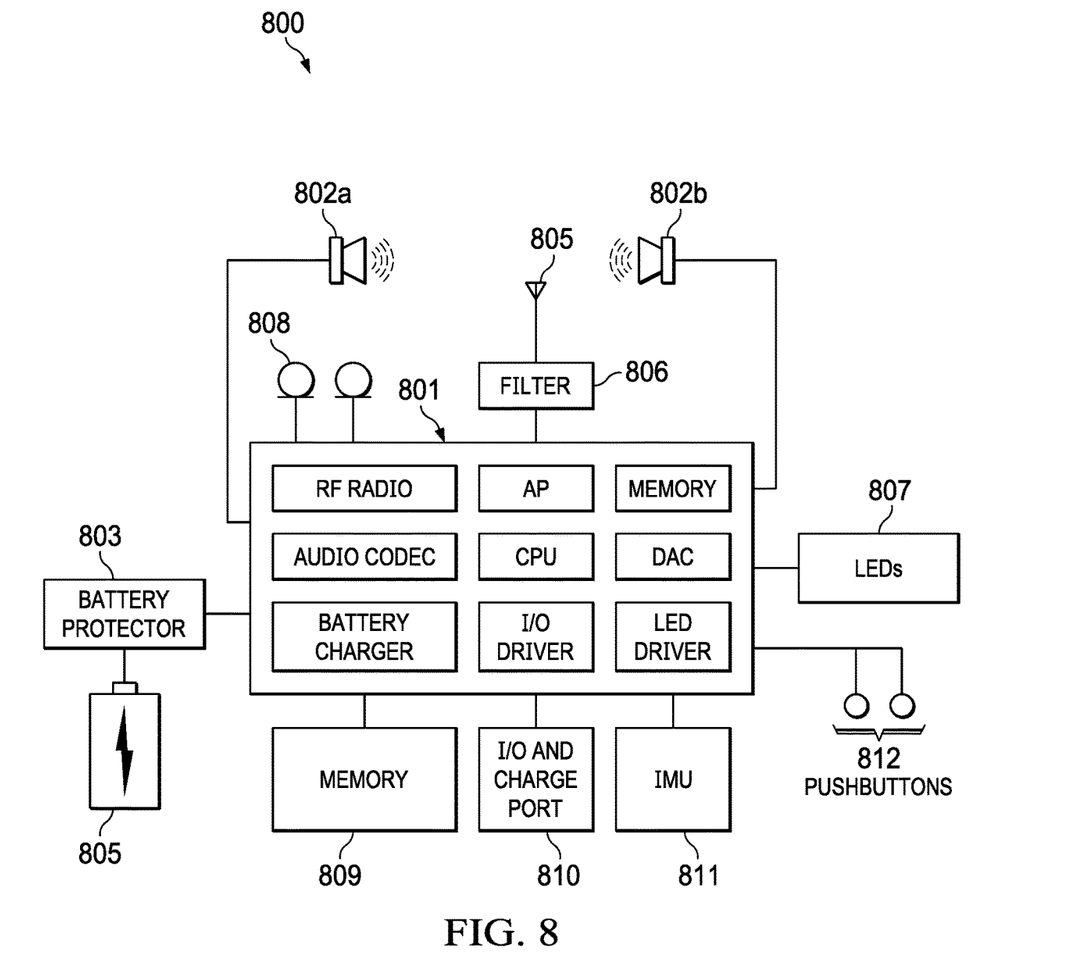
FIG. 8 a conceptual block diagram of a headset software/hardware architecture implementing at least one of the features and operations described in reference to FIGS. 1-6.

FIG. 8 is a conceptual block diagram of headset software/hardware architecture 800 implementing the features and operations described in reference to FIGS. 1-6. In an embodiment, architecture 800 can includes system-on-chip (SoC) 801, stereo loudspeakers 802a, 802b (e.g., ear buds, headphones, ear phones), battery protector 803, rechargeable battery 804, antenna 805, filter 806, LEDs 807, microphones 808, memory 809 (e.g., flash memory), I/O/Charge port 810, IMU 811 and pushbuttons 812 (or touch sensors, pressure sensors) for turning the headset on and off, adjusting volume, muting, etc. IMU 811 was previously described in reference to FIG. 1, and includes, for example, a 3-axis MEMS gyro and a 3-axis MEMS accelerometer. SoC 801 can be included in one or both left and right wireless ear pierces comprising headset 800.

SoC 801 further includes various modules, such as a radio frequency (RF) radio (wireless transceiver) for wireless bi-directional communication with other devices, such as a source device, as described in reference to FIGS. 1-6. SoC 801 further includes an application processor (AP) for running specific applications, memory (e.g., flash memory), central processing unit (CPU) for managing various functions of the headsets, audio codec for encoding/decoding audio, battery charger for charging/recharging rechargeable battery 804, I/O driver for driving I/O and charge port (e.g., a micro USB port), digital to analog converter (DAC) converting digital audio into analog audio and LED driver for driving LEDs 807. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   obtaining, with at least one processor, motion data from a headset worn by a user;
   selecting, with the at least one processor, features of a linked biomechanical model based on a current posture state;
   determining, with the at least one processor, at least one probability that a posture transition occurred based on an output of a classifier, where the output of the classifier is based on the selected features and the motion data;
   determining, with the at least one processor, a posture transition based on the at least one probability; and
   performing, with the at least one processor, at least one action based on detection of the posture transition.

2. The method of claim 1, wherein the motion data is an acceleration vector and the method further comprises:
   computing, with the at least one processor, a magnitude of the acceleration vector;
   comparing, with the at least one processor, the magnitude of the acceleration vector with a threshold acceleration; and
   determining, with the at least one processor, whether or not posture transition has occurred based on the comparing.

3. The method of claim 1, wherein the motion data is filtered by a low pass filter.

4. The method of claim 1, wherein the linked biomechanical model is a function of an angle between the ground and the user's thigh and angle between the user's thigh and the user's torso.

5. The method of claim 1, wherein the classifier is a Bayesian classifier that outputs a posterior probability that a posture transition occurred.

6. The method of claim 5, wherein multiple posterior probabilities are computed for multiple measurement epochs, the method further comprising:
   determining whether there is consensus among the multiple posteriori probabilities;
   in accordance with there being a consensus,
      determining whether a time since a last posture transition detection complies with a time threshold;
   in accordance with there not being a consensus; and
      determining that a posture transition did not occur; and
   determining that a posture transition occurred if there is a consensus and the time since the last posture transition detection satisfies the time threshold.

7. The method of claim 5, wherein determining a posture transition based on the at least one probability comprises comparing the at least one probability to a probability threshold, and determining that the at least one probability satisfies the probability threshold.

8. The method of claim 1, where the current posture state is either a sit-to-stand posture state or a stand-to-site posture state.

9. The method of claim 8, further comprising:
   transitioning, with a state machine, from the sit-to-stand posture state to the stand-to-sit posture state, or vice-versa, based on the current posture state.

10. The method of claim 1, wherein performing, with the at least one processor, at least one action based on detection of the posture transition further comprises enabling or re-enabling head pose tracking in an spatial audio application.

11. The method of claim 10, wherein the method is performed on a source device wirelessly coupled to the headset, and wherein the source device is playing content with spatial audio that is rendered for playback by the source device through loudspeakers of the headset.

12. A system comprising:
    at least one processor;
    memory storing instructions that when executed by the at least one processor, cause the at least one processor to perform operations comprising:
       obtaining motion data from a headset worn by a user;
       selecting features of a linked biomechanical model based on a current posture state;
       determining at least one probability that a posture transition occurred based on an output of a classifier, where the output of the classifier is based on the selected features and the motion data;
       determining a posture transition based on the at least one probability; and
       performing at least one action based on detection of the posture transition.

13. The system of claim 12, wherein the motion data is an acceleration vector and the operations further comprise:
    computing, with the at least one processor, a magnitude of the acceleration vector;
    comparing, with the at least one processor, the magnitude of the acceleration vector with a threshold acceleration; and determining, with the at least one processor, whether or not posture transition has occurred based on the comparing.

14. The system of claim 12, wherein the motion data is filtered by a low pass filter.

15. The system of claim 12, wherein the linked biomechanical model is a function of an angle between the ground and the user's thigh and angle between the user's thigh and the user's torso.

16. The system of claim 12, wherein the classifier is a Bayesian classifier that outputs a posterior probability that a posture transition occurred.

17. The system of claim 16, wherein multiple posterior probabilities are computed for multiple measurement epochs, the operations further comprising:
  determining whether there is consensus among the multiple posteriori probabilities;
  in accordance with there being a consensus,
    determining whether a time since a last posture transition detection complies with a time threshold;
  in accordance with there not being a consensus,
    determining that a posture transition did not occur; and
  determining that a posture transition occurred if there is a consensus and the time since the last posture transition detection satisfies the time threshold.

18. The system of claim 17, wherein determining a posture transition based on the at least one probability comprises comparing the at least one probability to a probability threshold, and determining that the at least one probability satisfies the probability threshold.

19. The system of claim 12, where the current posture state is either a sit-to-stand posture state or a stand-to-site posture state.

20. The system of claim 19, the operations further comprising:
  transitioning, with a state machine, from the sit-to-stand posture state to the stand-to-sit posture state, or vice-versa, based on the current posture state.

21. The system of claim 12, wherein performing at least one action based on detection of the posture transition further comprises enabling or re-enabling head pose tracking in an spatial audio application.

22. The system of claim 21, wherein the operations are performed at least in part on a source device wirelessly coupled to the headset, and wherein the source device is playing content with spatial audio that is rendered for playback by the source device through loudspeakers of the headset.

* * * * *

UNITED STATES PATENT AND TRADEMARK OFFICE
CERTIFICATE OF CORRECTION

PATENT NO. : 11,758,350 B2
APPLICATION NO. : 17/485212
DATED : September 12, 2023
INVENTOR(S) : Aditya Sarathy et al.

It is certified that error appears in the above-identified patent and that said Letters Patent is hereby corrected as shown below:

In the Claims

Column 12, Line 17, in Claim 6, delete "consensus; and" and insert -- consensus, --;

Column 12, Line 28, in Claim 8, delete "stand-to-site" and insert -- stand-to-sit --; and Column 14, Line 7, in Claim 19, delete "stand-to-site" and insert -- stand-to-sit --.

Signed and Sealed this
Thirty-first Day of October, 2023

Katherine Kelly Vidal
*Director of the United States Patent and Trademark Office*